US010042303B2

(12) United States Patent
Okumura

(10) Patent No.: US 10,042,303 B2
(45) Date of Patent: Aug. 7, 2018

(54) IMAGE FORMING DEVICE FOR CONTROLLING ATTACHED SUBMODULE IN MASTER-SLAVE MODE

(71) Applicant: KYOCERA Document Solutions Inc., Osaka-shi, Osaka (JP)

(72) Inventor: Takayuki Okumura, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 12 days.

(21) Appl. No.: 15/470,925

(22) Filed: Mar. 28, 2017

(65) Prior Publication Data
US 2017/0285547 A1 Oct. 5, 2017

(30) Foreign Application Priority Data

Mar. 31, 2016 (JP) ................. 2016-072085

(51) Int. Cl.
G03G 15/00 (2006.01)
G03G 21/18 (2006.01)
H04N 1/00 (2006.01)
H04N 1/32 (2006.01)
G03G 15/08 (2006.01)
G06K 15/02 (2006.01)

(52) U.S. Cl.
CPC ..... G03G 15/5083 (2013.01); G03G 15/5091 (2013.01); G03G 15/55 (2013.01); G03G 21/1892 (2013.01); G06K 15/02 (2013.01); H04N 1/00538 (2013.01); H04N 1/32598 (2013.01); G03G 15/0863 (2013.01); H04N 2201/0031 (2013.01); H04N 2201/0094 (2013.01)

(58) Field of Classification Search
CPC .......... G03G 15/5083; G03G 15/0863; G03G 15/50; G03G 21/1875; H04N 1/00538; H04N 1/32598
See application file for complete search history.

(56) References Cited

U.S. PATENT DOCUMENTS 5,083,162 A * 1/1992 Hanamoto ............. G03G 15/01
399/184
2011/0109938 A1* 5/2011 Refstrup .............. B41J 2/17546
358/1.15

FOREIGN PATENT DOCUMENTS

JP 2006-133996 A 5/2006
JP 2010-060978 A 3/2010

* cited by examiner

Primary Examiner — Sandra Brase
(74) Attorney, Agent, or Firm — Viering, Jentschura & Partner mbB

(57) ABSTRACT

Provided is an image processing apparatus to form an image on a sheet of paper, including a main body and a submodule detachably disposed on the main body. The main body includes an asynchronous serial bus and a master control unit. The submodule includes a slave control unit. An interactive asynchronous serial communication is performed between the master control unit and slave control unit. The master control unit includes a detection timing changing unit. The detection timing changing unit changes a scheduled timing to detect a second signal. The slave control unit includes a transmission signal changing unit. The transmission signal changing unit changes a state of the second signal from a first state detectable by the master control unit at a first timing to a second state detectable by the master control unit at a second timing.

8 Claims, 10 Drawing Sheets

IMAGE FORMING DEVICE FOR CONTROLLING ATTACHED SUBMODULE IN MASTER-SLAVE MODE

INCORPORATION BY REFERENCE

The disclosure of the Japanese Patent Application No. 2016-72085 filed on Mar. 31, 2016 including the specification, drawings and abstract is incorporated herein by reference in its entirety.

BACKGROUND

This disclosure relates to an image forming device.

Conventionally, image forming devices, in which detachable submodules, for example, replaceable cartridges for supplying consumables such as toner or ink, are attached to a main body on image forming, has been widely used. Some image forming devices to which such detachable submodules are attached controls an attached submodule in a master-slave mode. The master-slave mode means a mode in which roles are shared such that one (master) manages and controls the reminders, and the reminders (slave) are controlled when a plurality of apparatuses, devices, or the like work in cooperation with one another.

As an example of a technique using master-slave mode, an image forming device that detects and repairs connection abnormality of a removable process cartridge detachably attached to the image forming device is disclosed. This image forming device includes a serial communication line, a master communication means in a main body of the image forming device, and a slave communication means that transmits a data in a memory of a process cartridge to the master communication means via a serial communication line. The connection abnormality is detected in the following manner. First, an address data of an address format to specify a process cartridge is transmitted onto a serial communication line via the master communication means. A slave communication means responds to the address data and transmits an ACK signal onto the serial communication line in return. A control means detects a voltage of the serial communication line at a timing when the slave communication means transmits the ACK signal onto a serial communication line. When the detected voltage is out of the prescribed normal range, connection abnormality information is notified.

As an example of a control system using a master-slave mode, a system including a master device and a plurality of slave devices that are cascade-connected and supplies data signals to the master device is disclosed. The master device and the plurality of slave devices perform serial communication by synchronization to clock signals. In this system, a master device includes an ID-providing means to transmit ID information to identify each slave device by a data signal. The ID information is provided to slave devices successively from the most upstream side to the downstream side. This system can identify external devices, which are objects to transmit or to receive data, without any additional signal line other than clock signal lines and data signal lines.

SUMMARY

The present disclosure discloses an image forming device to form an image on a sheet of paper, including a main body and a submodule detachably disposed on the main body. The main body includes an asynchronous serial bus and a master control unit that is connected to the asynchronous serial bus, transmits a first signal onto an asynchronous serial bus, and detects, on the asynchronous serial bus, a second signal transmitted in response to the first signal at a scheduled timing.

The submodule includes a slave control unit that is connected to an asynchronous serial bus, and, when detecting the first signal transmitted from the master control unit on the asynchronous serial bus, transmits a second signal detectable by the master control unit in response to the first signal at the scheduled timing. An interactive asynchronous serial communication is performed between the master control unit and the slave control unit.

The master control unit includes a detection timing changing unit and a timing update notification transmission unit. The detection timing changing unit changes the scheduled timing to detect the second signal from a first timing to a second timing in accordance with a predetermined rule. The timing update notification transmission unit transmits a notification signal to notify an update of the scheduled timing changed by the detection timing changing unit to the slave control unit onto the asynchronous serial bus. The slave control unit includes a timing update notification detection unit and a transmission signal changing unit. The timing update notification detection unit detects the notification signal transmitted from the timing update notification transmission unit on the asynchronous serial bus. When the timing update notification detection unit detects the notification signal, the transmission signal changing unit changes the state of the second signal from a first state detectable by the master control unit at a first timing to a second state detectable by the master control unit at a second timing.

DETAILED DESCRIPTION

Figure 1:
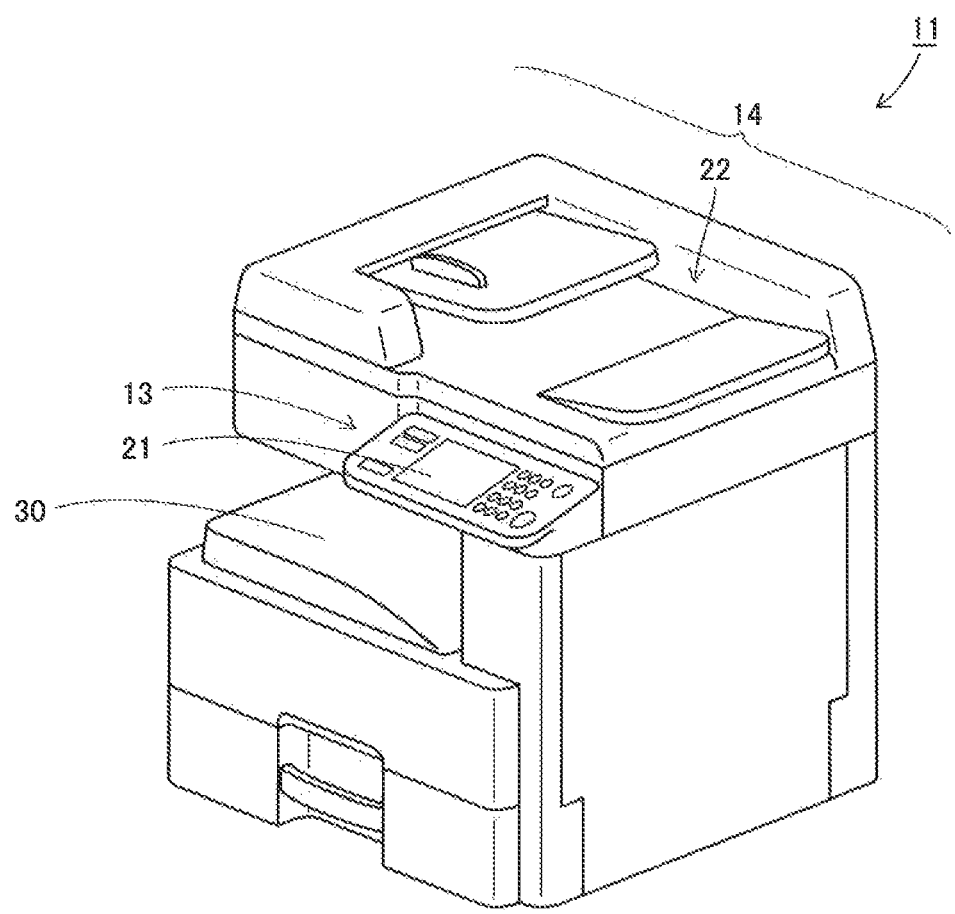
FIG. 1 is a schematic view illustrating an appearance of a multifunction peripheral when an image forming device according to one embodiment of the present disclosure is applied to the multifunction peripheral.
Figure 2:
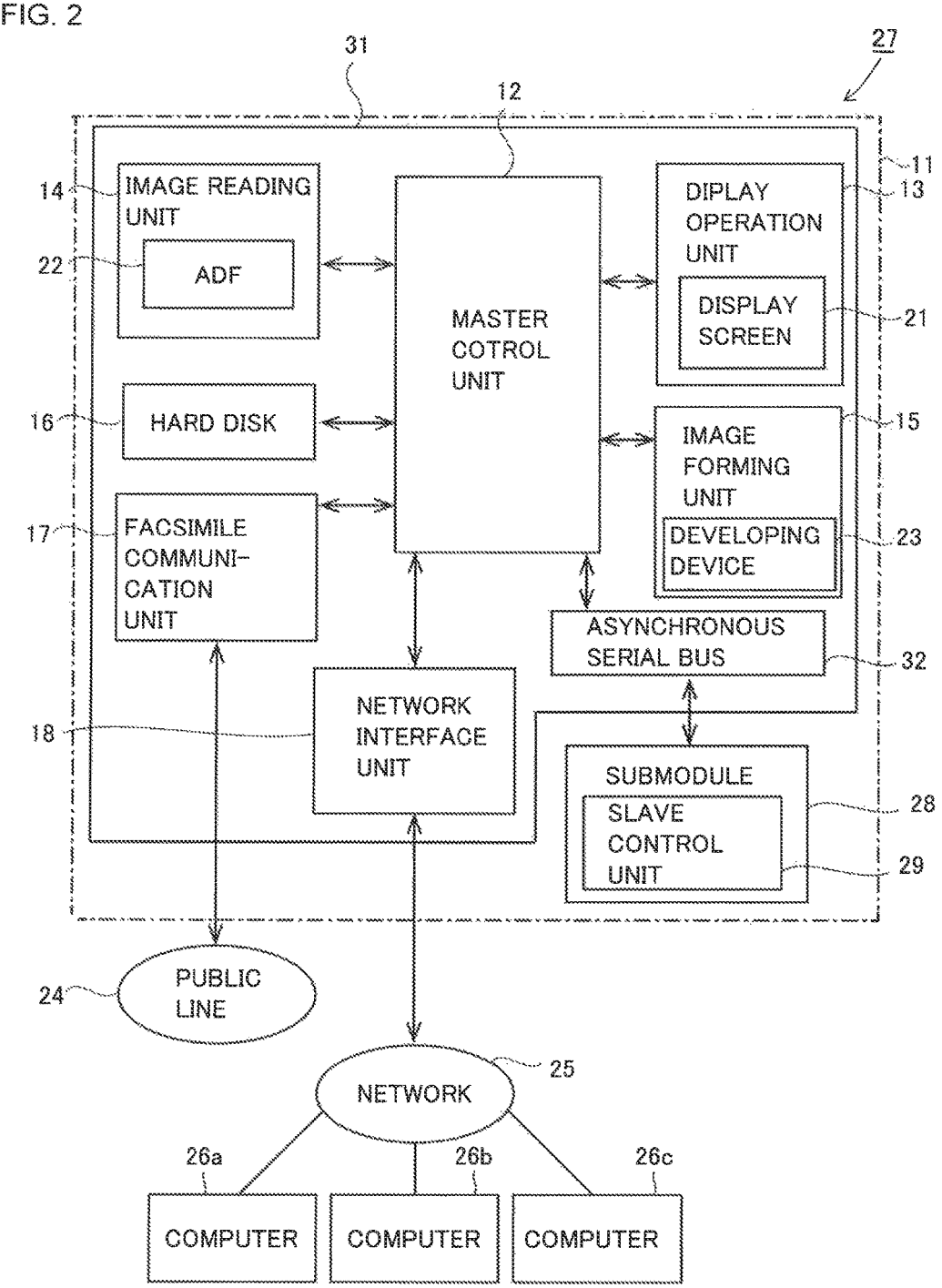
FIG. 2 is a block diagram illustrating a constitution of a multifunction peripheral when an image forming device according to one embodiment of the present disclosure is applied to the multifunction peripheral.

Hereinafter, an embodiment of the present disclosure is described. FIG. 1 is a schematic perspective view illustrating an appearance of a multifunction peripheral when an image processing device according to one embodiment of this disclosure is applied to the multifunction peripheral. FIG. 2 is a block diagram illustrating a constitution of a multifunction peripheral when an image forming device according to one embodiment of the present disclosure is applied to the multifunction peripheral.

Referring to FIGS. 1-2, a multifunction peripheral 11 as an image forming device according to one embodiment of the present disclosure includes a main body 31 and a submodule 28. The main body 31 includes a master control unit 12, a display operation unit 13, an image reading unit 14, an image forming unit 15, a discharge tray 30, a hard disk 16, a facsimile communication unit 17, a network interface unit 18 to establish a connection with a network 25, and an asynchronous serial bus 32. The submodule 28 further includes a slave control unit 29.

The master control unit 12 controls the whole of the multifunction peripheral 11. The display operation unit 13 includes a display screen 21 that displays information transmitted from the multifunction peripheral 11 and entries made by a user. The operation unit 13 allows a user to input image forming conditions, such as the number of copies and gradation degrees, and to turn on or off the power source. The image reading unit 14 includes an automatic manuscript conveying apparatus (ADF (Auto Document Feeder)) 22 that automatically conveys a manuscript loaded in a loading position to a reading position. The image reading unit 14 reads an image of a manuscript conveyed by the ADF 22 or an image of a manuscript loaded on a loading table. The image forming unit 15 includes a developing device 23 that performs development using a toner. The image forming unit 15 forms images based on the read images or image data transmitted via the network 25. That is, the image forming unit 15 forms an image on a recording medium such as a sheet of paper based on the image data in response to a request for image formation. The recording medium on which an image is formed by image forming unit 15 is discharged on a discharge tray 30 as a printed matter. The hard disk 16 stores the transmitted image data, the input image forming conditions, and so on. The facsimile communication unit 17 is connected to a public line 24, and performs facsimile transmission and facsimile reception.

The multifunction peripheral 11 also includes other components such as a DRAM (Dynamic Random Access Memory) that writes or read out image data, or a paper-sheet conveying unit that conveys a paper sheet onto which a visual image is formed using a developer, but their pictorial representations and descriptions are omitted. Arrows in FIG. 2 indicate a flow of control signals or data relating to control operations and images.

The digital multifunction peripheral 11 operates as a copier by forming an image in the image forming unit 15 based on the image data of a manuscript read by the image reading unit 14, and printing the image on a sheet of paper. The digital multifunction peripheral 11 also operates as a printer by forming an image in the image forming unit 15 based on the image data transmitted from computers 26a, 26b, and 26c connected to the network 25 via the network interface unit 18, and printing the image on a sheet of paper. Furthermore, the digital multifunction peripheral 11 operates as a facsimile device by forming an image in the image forming unit 15 based on image data transmitted from a public line 24 via the facsimile communication unit 17, or by transmitting image data of a manuscript, which is read by the image reading unit 14, through the facsimile communication unit 17 to the public line 24. In short, the multifunction peripheral 11 has a plurality of functions, such as a copying function, a printer function, and a facsimile function with respect to image processing. The multifunction peripheral 11 also has functions enabling detailed settings on each of the functions.

An image forming system 27 including the multifunction peripheral 11 includes the multifunction peripheral 11, and a plurality of computers 26a, 26b, and 26c. Specifically, the image forming system 27 includes the multifunction peripheral 11 having the above constitution and a plurality of computers 26a, 26b, and 26c that are connected to the multifunction peripheral 11 via the network 25. In this embodiment, three computers 26a-26c are illustrated. The computers 26a-26c each require practice of a print job to the multifunction peripheral 11 through the network 25 for printing out a printed matter. The multifunction peripheral 11 and the computers 26a-26c may be connected wirely through cables such as LAN (Local Area Network) cables or may be connected wirelessly. In the network 25, the other multifunction peripheral or servers such as a mail server may be connected.

A master control unit 12 installed in the main body 31 and a slave control unit 29 installed in the submodule 28 are connected to the asynchronous serial bus 32. An interactive asynchronous serial communication such as 1-Wire® communication is performed between the slave control unit 29 and the master control unit 12. The master control unit 12 transmits a first signal onto the asynchronous serial bus 32. If the slave control unit 29 detects a first signal transmitted from the master control unit 12 onto the asynchronous serial bus 32, the slave control unit 29 then transmits, onto the asynchronous serial bus 32, a second signal that is detectable by the master control unit 12 at a scheduled timing. The master control unit 12 detects the second signal, which is transmitted from the slave control unit 29 in response to the first signal, at a scheduled timing.

Figure 3:
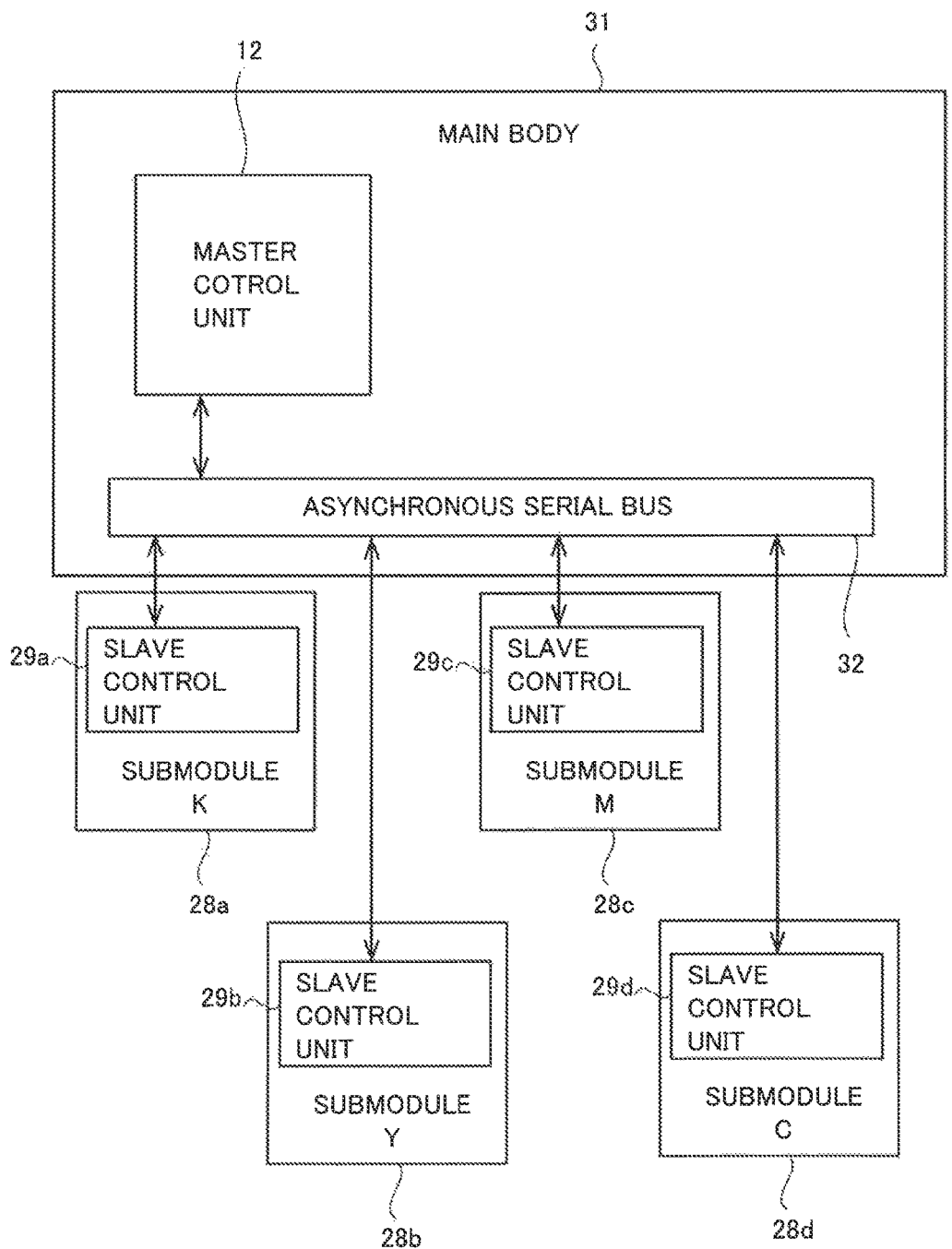
FIG. 3 is a block diagram simply illustrating a connection state between a master control unit and slave control units.

FIG. 3 is a block diagram simply illustrating a connection state between the master control unit 12 and the slave control units 29a-29d. In FIG. 3, the main body 31 provided with the master control unit 12 and four submodules 28a-28d each provided with corresponding slave control units 29a-29d are connected to the asynchronous serial bus 32. In the example illustrated in FIG. 3, these four submodules 28a-28d are toner cartridges containing toners of four colors consisting of black (K), yellow (Y), magenta (M), and cyan (C). Communication between the master control unit 12 and the slave control units 29a-29d is performed in the following manner. First, either one of the master control unit 12 and a slave control unit among the slave control units 29a-29d transmits a signal onto the asynchronous serial bus 32. The other detects the signal on the asynchronous serial bus 32 at a scheduled timing and reads the signal.

Although FIG. 3 shows an example in which the submodules 28a-28d correspond to four toner cartridges, the number or the types of the submodules are not limited to this. Examples of the submodules according to the present disclosure include a toner cartridge that houses a toner for forming an image, a photoreceptor that forms a toner image based on an image data and transfers the formed toner image to a sheet of paper, a transfer unit (drum unit) provided with a photoreceptor that converts photosignals into an image on a sheet of paper, a fixing unit that fixes a toner on a sheet of paper by welding a resin component of the toner with heat or a combination of heat and pressure, and a belt unit provided with a conveying belt to convey a sheet of paper. The submodule(s) which is to be attached to the main body 31 may be a single type of submodule, or may be a combination of two or more submodules.

Figure 4:
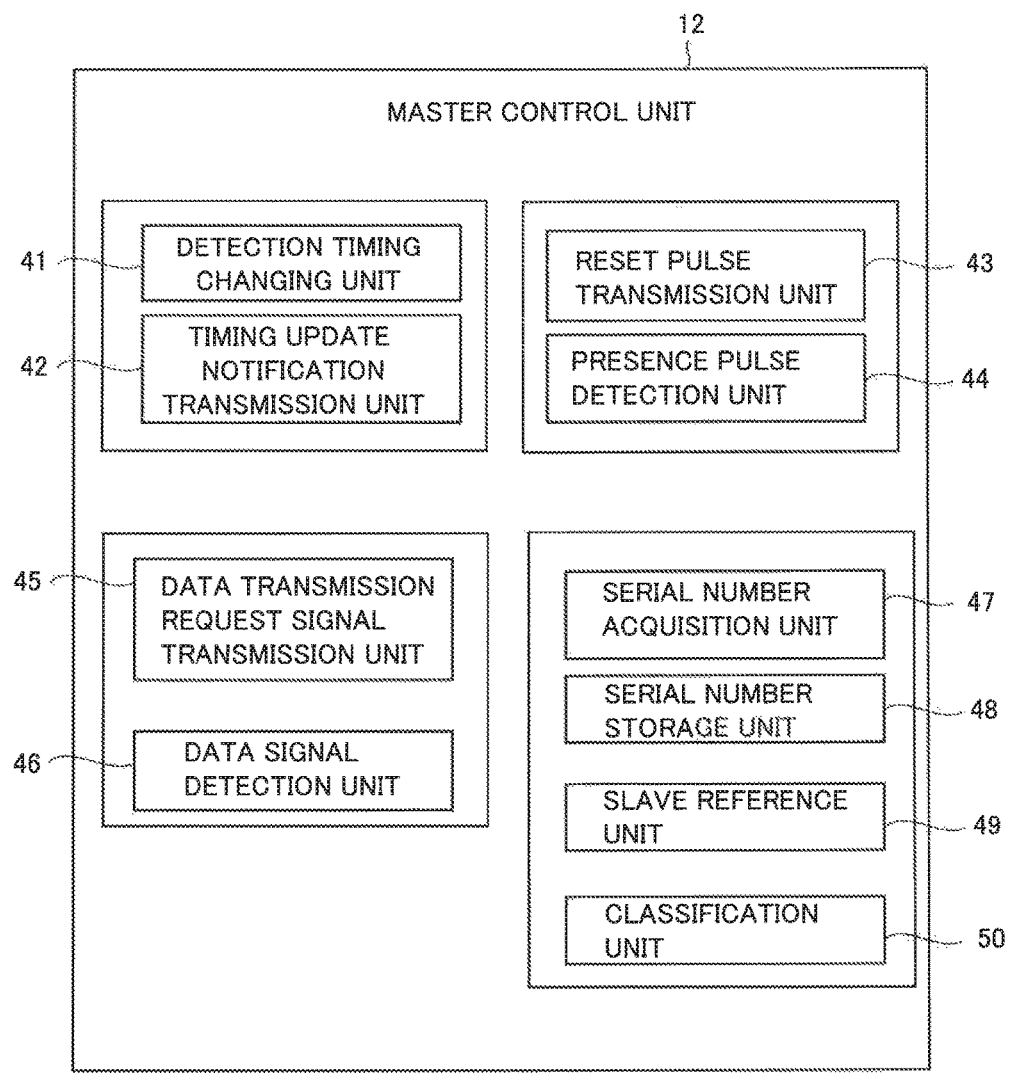
FIG. 4 is a block diagram illustrating a constitution of a master control unit.

Then, the constitution of the master control unit 12 is described. FIG. 4 is a block diagram illustrating a constitution of the master control unit 12. Referring to FIG. 4, the master control unit 12 includes a detection timing changing unit 41, a timing update notification transmission unit 42, a reset pulse transmission unit 43, a presence pulse detection unit 44, a data transmission request signal transmission unit 45, a data signal detection unit 46, a serial number acquisition unit 47, a serial number storage unit 48, a slave reference unit 49, and a classification unit 50.

The detection timing changing unit 41 changes a scheduled timing to detect a second signal transmitted from the slave control units 29a-29d onto the asynchronous serial bus 32 from a first timing into a second timing in accordance with a predetermined rule. The timing update notification transmission unit 42 transmits a notification signal onto the asynchronous serial bus 32 for notifying, to the slave control units 29a-29d, the fact that the scheduled timing is changed by the detection timing changing unit 41.

The reset pulse transmission unit 43 transmits a reset pulse signal to search the presence of the slave control units 29a-29d onto the asynchronous serial bus 32. The presence pulse detection unit 44 detects, at a scheduled timing, a presence pulse signal transmitted from slave control units 29a-29d to asynchronous serial bus 32 in response to the reset pulse signal transmitted from the reset pulse transmission unit 43.

The data transmission request signal transmission unit 45 transmits, onto the asynchronous serial bus 32a, a data transmission request signal requesting the master control unit 12 to transmit data to the slave control units 29a-29d. The data signal detection unit 46 detects, at a scheduled timing, a data signal transmitted onto the asynchronous serial bus 32 from the slave control units 29a-29d in response to the data transmission request signal transmitted from the data transmission request signal transmission unit 45. The serial number acquisition unit 47 inquires a serial number information storage unit 67 in the slave control units 29a-29d, which stores information of a unique serial number assigned to each slave control unit of the slave control units 29a-29d, and acquires serial numbers of all slave control units 29a-29d that is connected to the asynchronous serial bus 32. The serial number storage unit 48 stores serial numbers acquired by the serial number acquisition unit 47.

The slave reference unit 49 refers and compares information of a serial number stored in the serial number storage unit 48 in advance and information of serial number newly acquired by the serial number acquisition unit 47. As the result of comparison by the slave reference unit 49, when the at least one piece of the information between the information of a serial number stored in the serial number storage unit 48 in advance and the information of serial number acquired by the serial number acquisition unit 47 is different, the detection timing changing unit 41 changes the scheduled timing to detect the second signal from a first timing to a second timing. The classification unit 50 classifies the slave control units 29a-29d into certain categories on the basis of the information of a serial number acquired by the serial number acquisition unit 47. At this time, the detection timing changing unit 41 changes the setting of the first timing and the second timing for each category classified by the classification unit 50.

Figure 5:
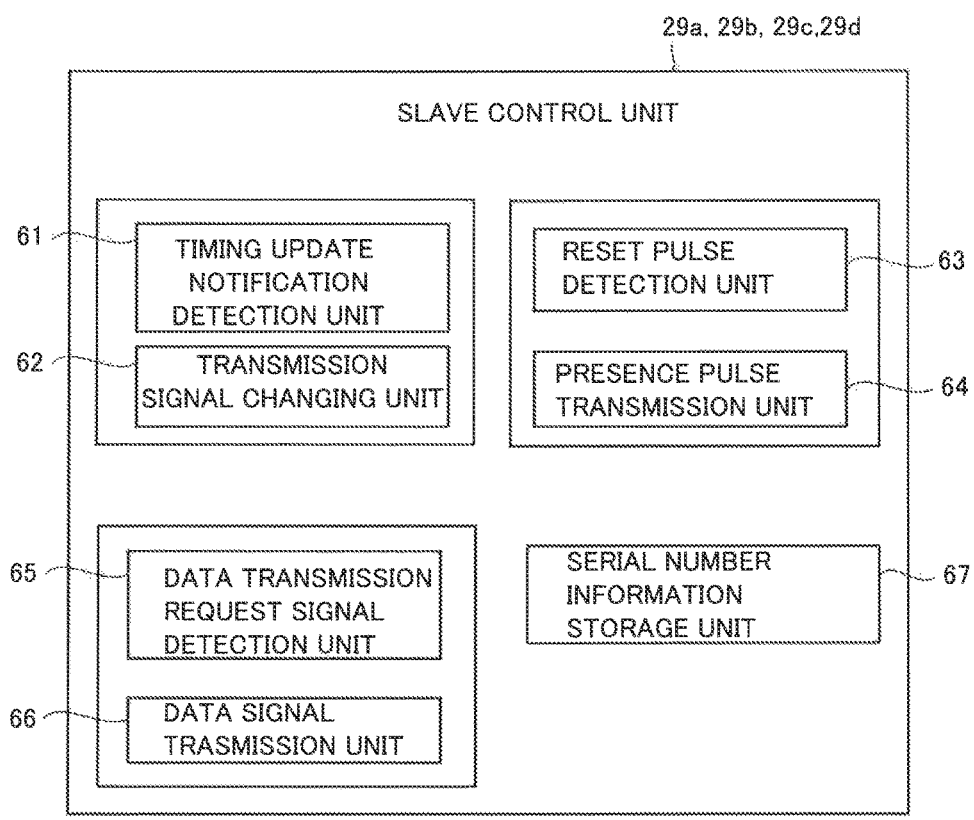
FIG. 5 is a block diagram illustrating a constitution of slave control units.

Next, the constitution of the slave control units 29a-29d are described. FIG. 5 is a block diagram illustrating a constitution of the slave control units 29a, 29b, 29c and 29d.

Referring to FIG. 5, the slave control units 29a-29d each include a timing update notification detection unit 61, a transmission signal changing unit 62, a reset pulse detection unit 63, a presence pulse transmission unit 64, a data transmission request signal detection unit 65, a data signal transmission unit 66, and a serial number information storage unit 67.

The timing update notification detection unit 61 detects a notification signal transmitted in a timing by the timing update notification transmission unit 42 on the asynchronous serial bus 32. When the timing update notification detection unit 61 detects a notification signal, the transmission signal changing unit 62 changes a second signal from a first state that is detectable by the master control unit 12 at a first timing to the second state that is detectable by the master control unit 12 at a second timing. The reset pulse detection unit 63 detects a reset pulse signal transmitted from the reset pulse transmission unit 43 on the asynchronous serial bus 32. When the reset pulse detection unit 63 detects the reset pulse signal, the presence pulse transmission unit 64 transmits a presence pulse signal onto the asynchronous serial bus 32. The data transmission request signal detection unit 65 detects a data transmission request signal transmitted from the data transmission request signal transmission unit 45 on the asynchronous serial bus 32. When the data transmission request signal detection unit 65 detects a data transmission request signal, the data signal transmission unit 66 transmits a data signal onto the asynchronous serial bus 32. The serial number information storage unit 67 stores information of serial numbers assigned to each of the slave control units 29a-29d.

Figure 6:
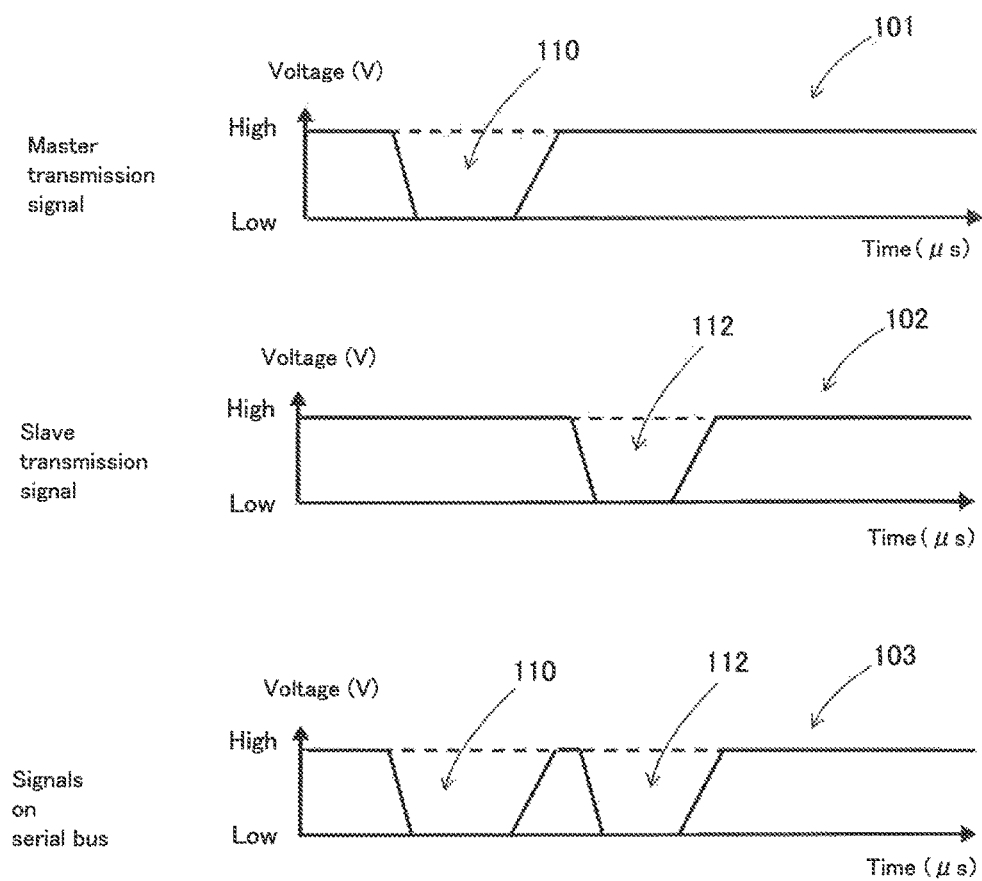
FIG. 6 is a view to explain a state of pulses on an asynchronous serial bus.

Next, the state of signals on the asynchronous serial bus 32 to which the master control unit 12 and the slave control units 29a-29d are connected. FIG. 6 is a view to explain a state of pulses on the asynchronous serial bus 32.

Referring to FIG. 6, the master transmission signal 101 only indicates a reset pulse signal 110 transmitted from the master control unit 12. The reset pulse transmission unit 43 of the master control unit 12 transmits a reset pulse signal onto the asynchronous serial bus 32 by switching the output from "High" to "Low" in a certain period, as indicated as the master transmission signal 101. The reset pulse signal 110 are detected by the reset pulse detection unit 63 in the slave control units 29a-29d. When the reset pulse detection unit 63 detects the reset pulse signal 110, the presence pulse transmission unit 64 in the slave control units 29a-29d then transmits a presence pulse signal 112 onto the asynchronous serial bus 32 by switching the output of the voltage from "High" to "Low" in a predetermined period, as a slave transmission signal 102.

Since the master control unit 12 and the slave control units 29a-29d share the same communication line, an actual signal on the asynchronous serial bus 32 shows such a state as the signal 103, which is a synthesized wave signal of the reset pulse signal 110 and the presence pulse signal 112. The presence pulse detection unit 44 of the master control unit 12 detects the presence pulse signal 112 on the asynchronous serial bus 32 at a scheduled timing. The master control unit 12 and each of the slave control units 29a-29d communicate with each other in this way.

Next, a flow of processing in an image forming device according to one embodiment of the present disclosure in a case where a reset pulse signal and a presence pulse signal are transmitted or received between the master control unit 12 and the slave control units 29a-29d in the multifunction peripheral 11 is described. In this embodiment, four slave control units 29a-29d are connected to the asynchronous serial bus 32, as illustrated in FIG. 3.

Figure 7:
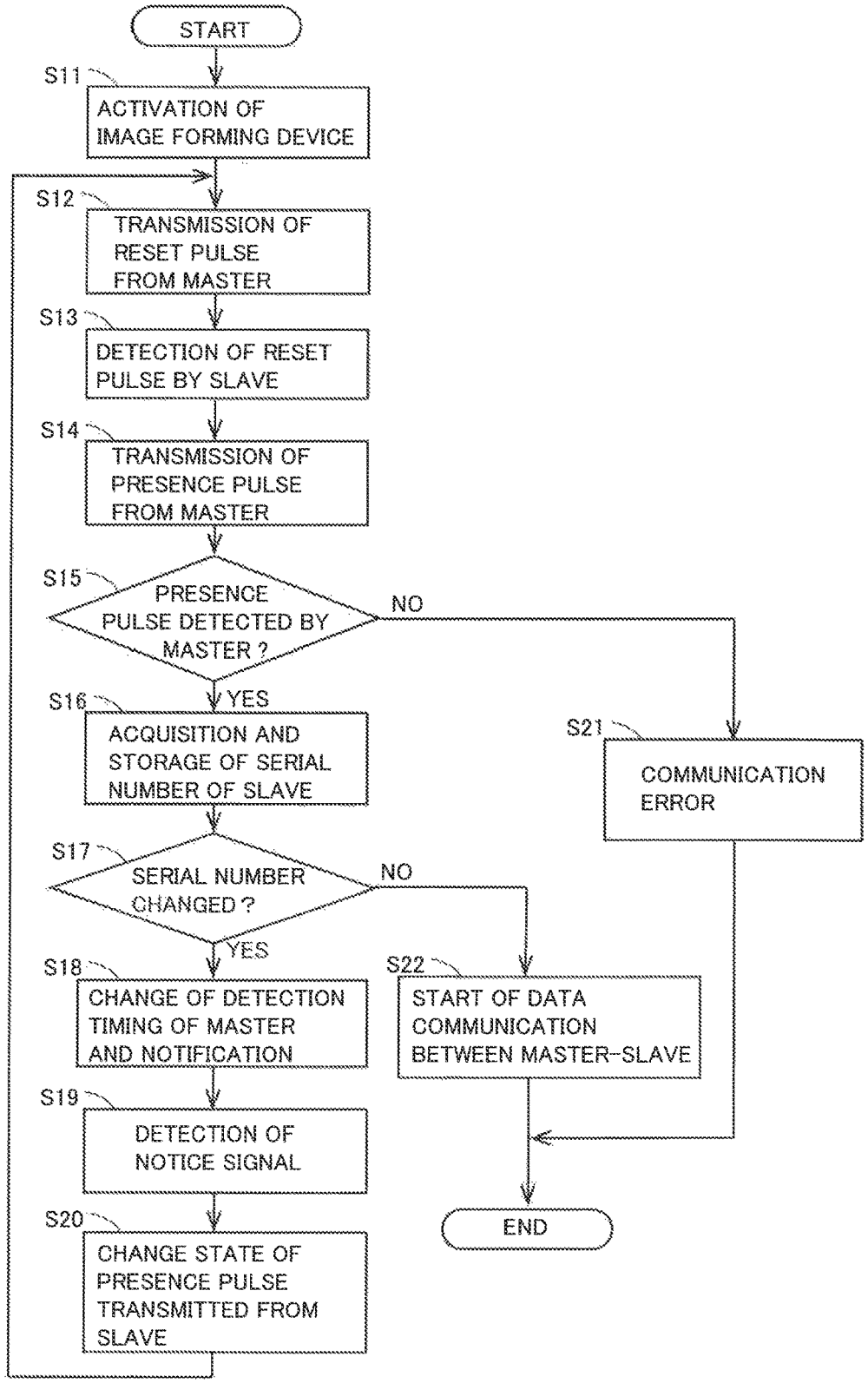
FIG. 7 is a flow chart illustrating a flow of processing on authentication of submodules in an image forming device according to one embodiment of the present disclosure.

FIG. 7 is a flow chart illustrating a flow of processing on authentication of submodules in an image forming device according to one embodiment of the present disclosure. Referring to FIG. 7, the first signal transmitted from the master control unit 12 is a reset pulse signal to search the presence of the slave control units 29a-29d in this embodiment. The second signal is the presence pulse signal which is returned from the slave control units 29a-29d to the master control unit 12 to indicate the presence of the slave control units 29a-29d in response to the reset pulse signal.

Figure 8:
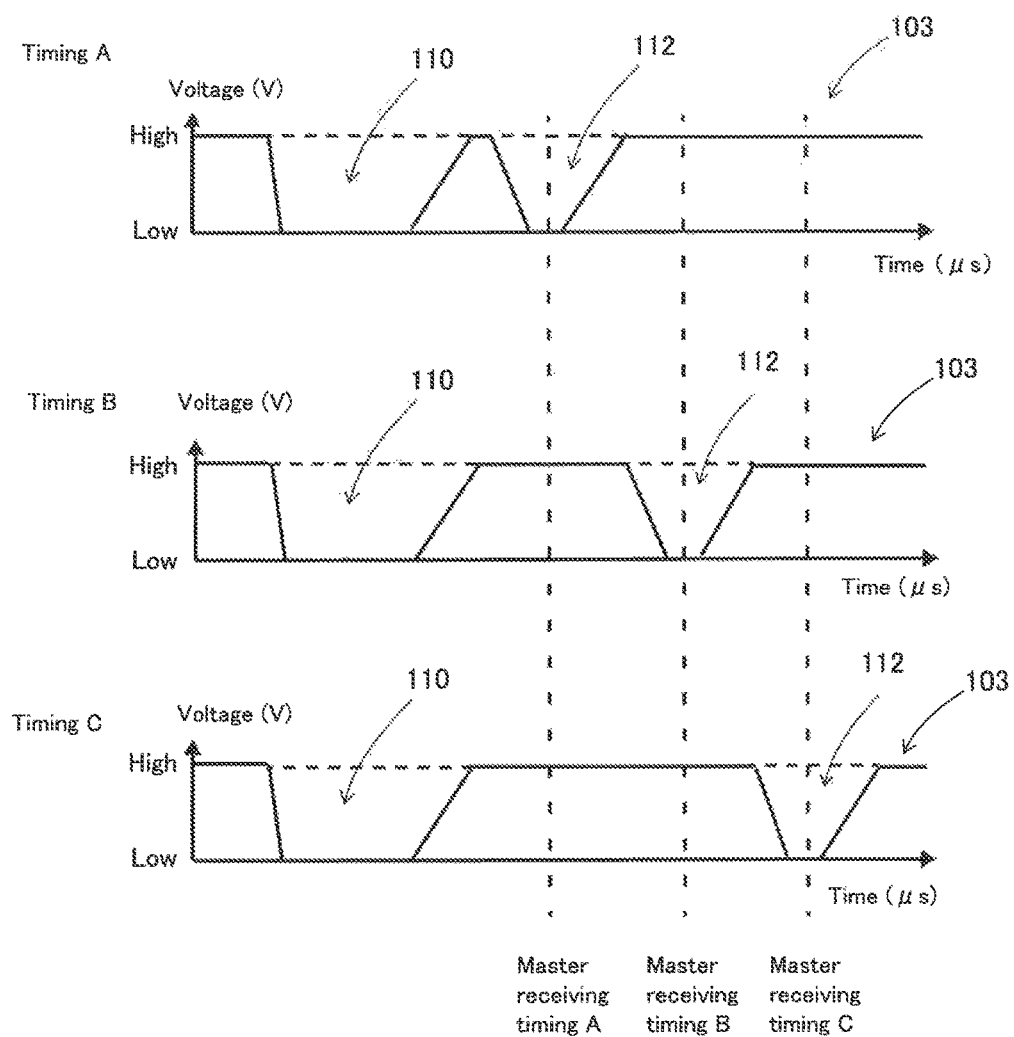
FIG. 8 is a view to explain a state of pulses on an asynchronous serial bus upon authentication of submodules.

FIG. 8 is a view of to explain a state of pulses on an asynchronous serial bus 32 upon authentication of submodules.

Referring to FIGS. 7 and 8, a multifunction peripheral 11 as the image forming device is first activated (step S11, hereinafter, the word "step" is omitted). Whenever the multifunction peripheral 11 is activated, processing called bus reset is carried out between the master control unit 12 and the slave control units 29a-29d. In the bus reset procedure, the master control unit 12 first transmits a reset pulse signal 110 onto the asynchronous serial bus 32 by switching the output from High to Low for a certain period of time (S12). By this transmission of the reset pulse signal 110, the master control unit 12 searches the presence of the slave control units 29a-29d and informs the slave control units 29a-29d of a start of communication. The slave control units 29a-29d detect the reset pulse signal 110 transmitted from the master control unit 12 on the asynchronous serial bus 32 (S13).

Then, in response to the reset pulse signal 110, the slave control units 29a-29d each transmit a presence pulse signal 112 on the asynchronous serial bus 32 (S14). More specifically, the presence pulse signal 112 in a state where the master control unit 12 can detect at a timing of "master receiving timing A" (hereinafter, referred to as the "timing A") of FIG. 8 is transmitted by switching the output on the slave control units 29a-29d side from High to Low for a certain period of time. The master control unit 12 detects that the output is switched from High to Low at the timing A on the asynchronous serial bus 32. The master control unit 12 thereby detects the presence pulse signal 112 (YES in S15). Thus, the presence pulse signal 112 is initially detected at the timing A by the master control unit 12. It is assumed that information about the timing to detect the signal is shared beforehand between the master control unit 12 and each of the slave control units 29a-29d.

The master control unit 12 searches the presence of at least one slave control unit that is connected to the asynchronous serial bus 32 by detecting the presence pulse signal 112 at the timing A. In this embodiment, four slave control units 29a-29d are connected to the asynchronous serial bus 32. Since the presence pulse signal 112 is transmitted simultaneously from the four slave control units 29a-29d, the master control unit 12 can detect that some slave control units are connected but cannot identify each of the slave control units 29a-29d at this time.

Next, the master control unit 12 acquires and stores serial numbers of each of the slave control units 29a-29d to identify the slave control units 29a-29d that are connected to the asynchronous serial bus 32 (S16). Each of the slave control units 29a-29d are thereby identified. Each of the slave control units 29a-29d has a unique serial number assigned to each of the slave control units 29a-29d, and the serial numbers are stored in the serial number information storage unit 67 of each of the slave control units 29a-29d.

The serial number acquisition unit 47 in the master control unit 12 inquires a serial number information storage unit 67 in the slave control units 29a-29d, and acquires a serial number of all of the slave control units 29a-29d that are connected to the asynchronous serial bus 32. The serial number storage unit 48 stores a serial number acquired by the serial number acquisition unit 47.

The slave reference unit 49 refers to the serial number information that has been stored beforehand in the serial number storage unit 48 and the serial number information acquired by the serial number acquisition unit 47, and compares them (S17). When at least one piece of the serial number information newly acquired by the serial number acquisition unit 47 is different from the serial number information that has been stored beforehand in the serial number storage unit 48 as a result of comparison by the slave reference unit 49, the detection timing changing unit 41 changes the timing to detect the presence pulse signal 112 from the timing A indicated in FIG. 8 to the "master receiving timing B" (hereinafter, referred to as timing B) (or to the "master receiving timing C" (hereinafter, referred to as timing C)). Furthermore, the timing update notification transmission unit 42 transmits a notification signal to the slave control units 29a-29d on the asynchronous serial bus 32 for notifying the update of the timing that the timing to detect the presence pulse signal 112 is changed to the timing B (or timing C) (S18).

The timing update notification detection unit 61 of the slave control units 29a-29d detects a notification signal transmitted from the timing update notification transmission unit 42 on the asynchronous serial bus 32 (S19). When a notification signal is detected by the timing update notification detection unit 61, the transmission signal changing unit 62 changes the presence pulse signal 112 to be transmitted from one state detectable by the master control unit 12 at the timing A to another state detectable by the master control unit 12 at the timing B (or the timing C) (S20).

After the timing to detect the presence pulse signal 112 by the master control unit 12 and the state of the presence pulse signal 112 transmitted from the slave control units 29a-29d are changed in this way, the bus reset is performed again (S12-S15). At this time, if a submodule that includes a slave control unit not having the timing update notification detection unit 61 and the transmission signal changing unit 62 is attached to the main body 31, the slave control unit transmits a presence pulse signal 112 that is only detectable at the timing A before change of detectable timing (S14). Thus, the master control unit 12 cannot detect the presence pulse signal 112 at the timing B (or timing C) after the change of detectable timing (NO in S15). As a result, a communication error occurs between the master control unit 12 and a slave control unit (S21).

In contrast, submodules 28a-28d that include a slave control unit according to the present disclosure are attached to the main body 31, a presence pulse signal 112 that is detectable by the master control unit 12 at the timing B (or the timing C) is transmitted from the slave control units 29a-29d. As a result, the master control unit 12 can detect the presence pulse signal 112 on the asynchronous serial bus 32 at the timing B (or timing C).

Thus, even if a timing of the detection of presence pulse signal 112 is changed, communication between the master control unit 12 and the slave control units 29a-29d is maintained. Then, serial numbers of the slave control units 29a-29d are acquired again by the serial number acquisition unit 47 (S16). Then, since the attached submodules 28a-28d are not changed, there is no change in serial numbers. When the serial number information that has been stored beforehand in the serial number storage unit 48 and the serial number information acquired by the serial number acquisition unit 47 are judged identical as a result of comparison by slave reference unit 49, data communication starts between the master control unit 12 and the slave control units 29a-29d (S22).

Then, a flow that an image forming device according to another embodiment of this disclosure performs data communication between the master control unit 12 and the slave control units 29a-29d in the multifunction peripheral 11 is described.

Figure 9:
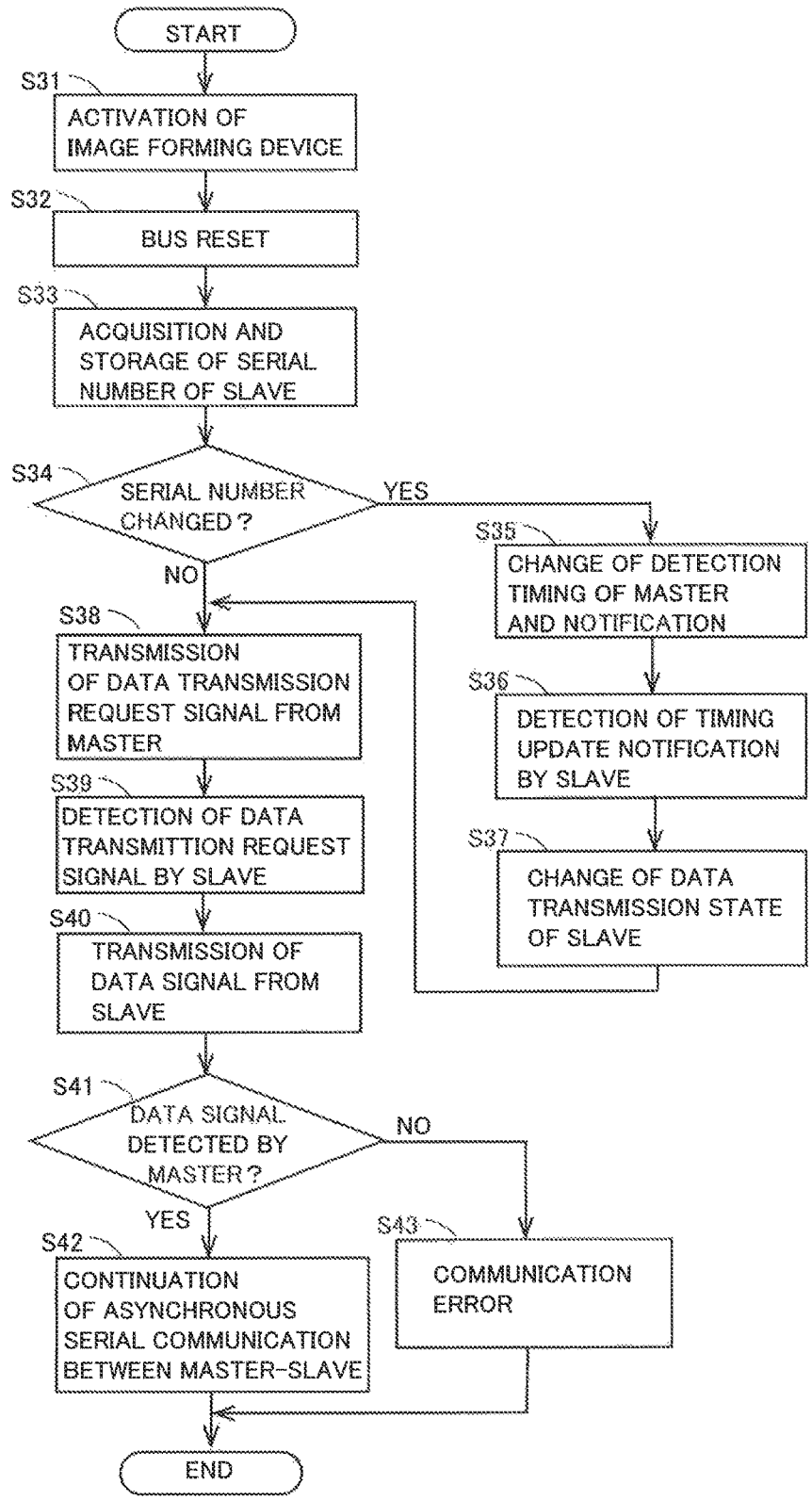
FIG. 9 is a flow chart illustrating a flow of processing on data communication between a master control unit and slave control units in an image forming device according to one embodiment of the present disclosure.

FIG. 9 is a flow chart illustrating a flow of processing on data communication between the master control unit 12 and the slave control units 29a-29d in an image forming device according to another embodiment of the present disclosure. In this embodiment, the first signal transmitted from the master control unit 12 is a data transmission request signal to request to transmit data from the master control unit 12 to the slave control units 29a-29d. The second signal is a data signal transmitted from the slave control units 29a-29d onto the asynchronous serial bus 32 in response to the data transmission request signal.

Figure 10:
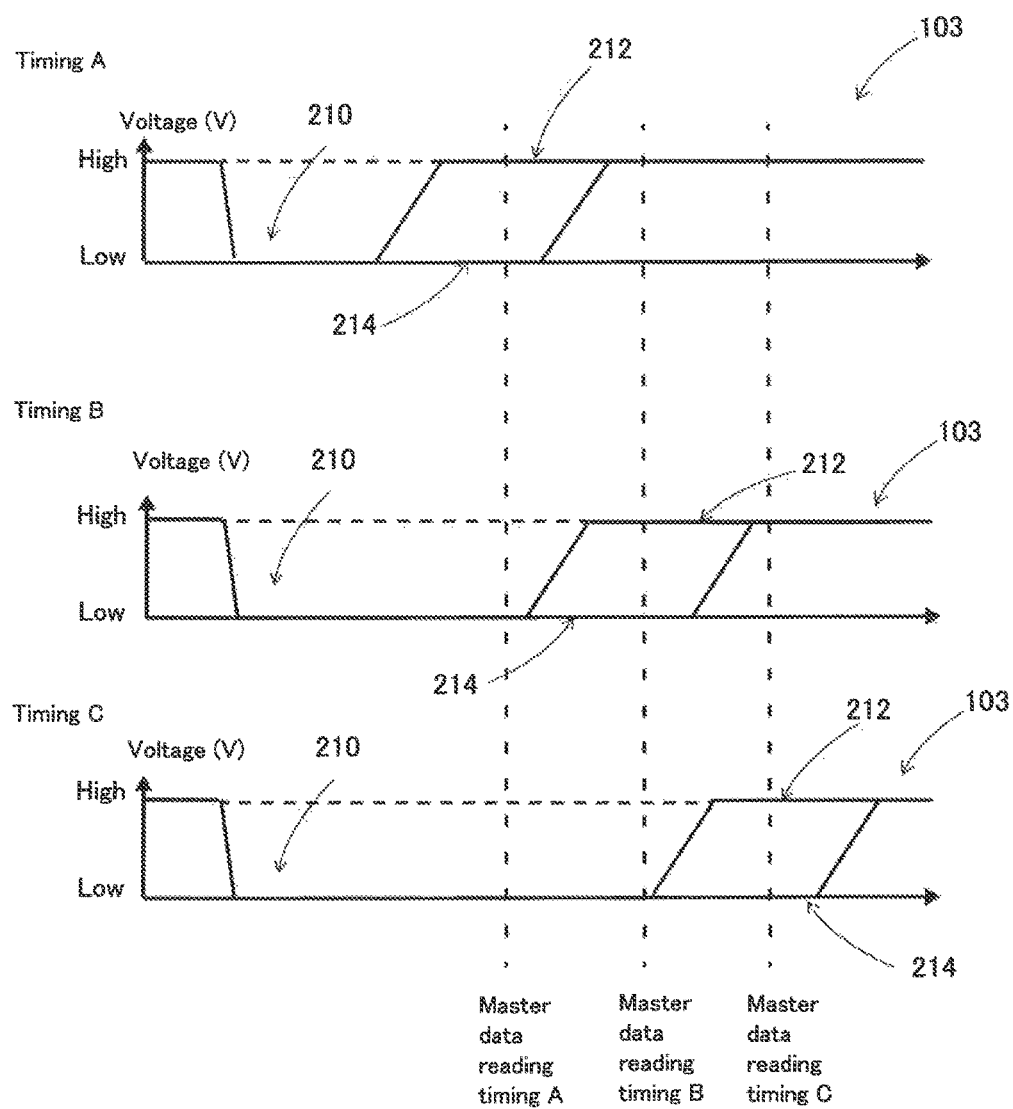
FIG. 10 is a view illustrating a state of pulses on the asynchronous serial bus upon data communication between a master control unit and slave control units.

FIG. 10 is a view illustrating a state of pulses on the asynchronous serial bus upon data communication between the master control unit 12 and the slave control units 29a-29d.

Referring to FIGS. 9 and 10, the multifunction peripheral 11 as the image forming device is activated (S31). Then, a bus reset procedure (S32) and a serial number identification processing (S33-S34) are performed. In the serial number identification processing, the serial number acquisition unit 47 first inquires the serial number information storage unit 67 in the slave control units 29a-29d, and acquires serial numbers of all slave control units 29a-29d that are connected to the asynchronous serial bus 32. The serial number storage unit 48 stores the serial numbers (S33).

The slave reference unit 49 refers to and compares the serial number information that has been stored beforehand in the serial number storage unit 48 and the serial number information newly acquired by the serial number acquisition unit 47 (S34). When at least one piece of the serial number information is different as a result of comparison (YES in S34) as a result of comparison by the slave reference unit 49, the detection timing changing unit 41 changes the timing of detection of the data signal 212 or data signal 214 transmitted from the slave control units 29a-29d onto the asynchronous serial bus 32 which are detectable by the master control unit 12 from the timing A indicated in FIG. 10 to the timing B (or C). The timing update notification transmission unit 42 transmits a notification signal onto the asynchronous serial bus 32 to notify to the slave control units 29a-29d that the detection timing changing unit 41 has changed the timing of the detection of the data signal 212 or the data signal 214 to the timing B (or timing C) (S35).

The timing update notification detection unit 61 in the slave control units 29a-29d detects a notification signal transmitted from the timing update notification transmission unit 42 on the asynchronous serial bus 32 (S36). When the timing update notification detection unit 61 detects a notification signal, transmission signal changing unit 62 changes the data signal 212 or the data signal 214 from a state detectable by the master control unit 12 at the timing A to a state detectable by the master control unit 12 at the timing B (or timing C) (S37).

Next, the data transmission request signal transmission unit 45 in the master control unit 12 transmits a data transmission request signal 210 to request to transmit data from the master control unit 12 to the slave control units 29a-29d on the asynchronous serial bus 32 (S38).

The data transmission request signal detection unit 65 in the slave control units 29a-29d detects a data transmission request signal 210 transmitted from the data transmission request signal transmission unit 45 on the asynchronous serial bus 32 (S39). When the data transmission request signal detection unit 65 detects the data transmission request signal 210, the data signal transmission unit 66 transmits the data signal 212 or the data signal 214 onto the asynchronous serial bus 32 (S40).

The data signal detection unit 46 of the master control unit 12 detects the data signal 212 or data signal 214 at the changed timing B (YES in S41). At this time, as the slave control units 29a-29d according to the present disclosure, when a submodule including a slave control unit not having a timing update notification detection unit 61 and the transmission signal changing unit 62 is attached to the main body 31, the data signal 212 or the data signal 214 transmitted from the slave control unit is not detected by the master control unit 12 at the changed timing B (or the timing C) (NO in S41). As a result, a communication error occurs between the master control unit 12 and a slave control unit (S43).

In contrast, when the submodules 28a-28d each provided with corresponding slave control units 29a-29d according to this disclosure is attached to the main body 31, the slave control units 29a-29d transmit the data signal 212 or the data signal 214 that is detectable by the master control unit 12 at the timing B (or the timing C). As a result, the master control unit 12 can detect the data signal 212 or the data signal 214 on the asynchronous serial bus 32 at the timing B (or the timing C). Thus, even if a timing to detect the data signal 212 or the data signal 214 is changed, communication between the master control unit 12 and the slave control units 29a-29d is continued (S42).

Now, if the serial number is judged unchanged as a result that the serial number acquisition unit 47 refers to and compares the serial number information in in S34 (NO in S34), timing changing processing of S35-S37 is omitted, and the data transmission request signal transmission unit 45 transmits the data transmission request signal 210 in S38.

The slave reference unit 49 compares serial number information that has been stored beforehand in the serial number storage unit 48 and serial number information acquired by the serial number acquisition unit 47 in S17 or S34, and judges that the serial numbers are different in either one of the following cases:

(1) A case where the total number of the slave control units connected to the asynchronous serial bus 32 is changed, or (2) A case where, although the total number of the slave control units connected to the asynchronous serial bus 32 is unchanged, but at least one of submodules 28a-28 is exchanged to another submodule.

(Regarding the Predetermined Rule)

As explained above, the master control unit 12 detects a second signal (presence pulse signal, data signal, etc.) transmitted from the slave control units 29a-29d at a scheduled timing. The timing of detection is changed from a first timing (timing A in the above embodiment) to a second timing (timing B or timing C) by the detection timing changing unit 41 in accordance with a predetermined rule.

The predetermined rule includes (1) a rule to change the timing of signal detection by the master control unit 12 and (2) a rule relating to an original first timing, and (3) a rule relating to a second timing after change of the timing.

In the above embodiment, the rule (1) to change the timing means that, if at least one piece of serial number information newly acquired by the serial number acquisition unit 47 is different from serial number information that has been stored beforehand in the serial number storage unit 48 as a result of comparison by the slave reference unit 49, the timing is changed in accordance with the rule (1). However, the rule to change the timing is not particularly limited to this. For example, a timing of the signal detection may be changed periodically or non-periodically without referring to serial number information of each of the slave control units 29a-29d. Alternatively, a timing of the signal detection may be changed whenever a predetermined number of times of imaging forming has been made in an image forming device.

A rule (2) relating to the original first timing means a rule relating to a signal detection timing before a change of detection timing, for example, whether an initial timing to detect a signal by the master control unit 12 is the original timing A or another timing. For example, the first timing may be set so as to be different for each destination where the image forming device is used. For example, the timing of signal detection by the master control unit 12 may be set to be a timing A for a model to be used in Japan, a timing B for a model to be used in the United States, and a timing C for a model to be used in Europe. Alternatively, the first timing may be set to be different for each model of the image forming devices.

A rule (3) relating to the second timing after a change of timing means a rule relating to a signal detection timing after change of timing. For example, assuming that the first timing of the initial setting is a timing A, the detection timing changing unit 41 determines whether the timing at which a signal is detected by the master control unit 12 is set to be a timing B, timing C, or another timing other than the timing B or the timing C under this rule (3). Regarding this rule (3), settings may be changed depending on destinations where the image forming device is used, or models of the image forming devices in a similar manner to the rule (2) that relates to the first timing.

It is preferable that the predetermined rule is shared between the master control unit 12 and each of the slave control units 29a-29d in advance. For example, the master control unit 12 and the slave control units 29a-29d may share a common or corresponding table or random numbers to define a rule. Since a non-genuine submodule does not have such a table or random numbers, the communication between the non-genuine submodule attached to the main body 31 and the main body 31 can be effectively blocked. However, even if each of the slave control units 29a-29d does not have information relating to the predetermined rule, a notification signal transmitted from the timing update notification transmission unit 42 includes information relating to the updated timing of detection. Thus, each of the slave control units 29a-29d can acquire information about the timing of signal detection after update by transmitting a notification signal from the timing update notification detection unit 61. The image forming device works when the transmission signal changing unit 62 changes the state of the signal to be transmitted on the basis of the acquired information.

Regarding the first timing to detect a presence pulse signal or a data signal and the second timing after change, the slave control units 29a-29d may be classified into a predetermined categories depending on serial numbers of slave control units 29a-29d, and may change a timing to detect a signal according to a different rule for every category.

Specifically, the serial number acquisition unit 47 inquires the serial number information storage unit 67 of the slave control units 29a-29d, and the serial number acquisition unit 47 acquires serial numbers stored in the serial number information storage unit 67. The classification unit 50 in the master control unit 12 classifies each of the slave control units 29a-29d into predetermined categories on the basis of the serial number information acquired by serial number acquisition unit 47. For example, depending on the type of a particular bit included in a serial number, the slave control units 29a-29d can be assigned to a category A having an initial signal detection timing of timing A as indicated in FIG. 8 or FIG. 10, or a category B having an initial signal detection timing of timing B, or a category C having an initial signal detection timing of timing C. Then, a timing of the signal detection of the category A can be changed from timing A to timing B or further to timing C. Similarly, the timing of the category B and the category C can also be changed.

The above is a series of flows of the present disclosure. However, the embodiment described above is mere an illustration and can omit part of the steps and the structures. For example, the serial number acquisition unit 47, the serial number storage unit 48, and the slave reference unit 49 in the master control unit 12 are not necessarily disposed in the master control unit 12. Even though serial numbers of the slave control units 29a-29d are not acquired, it is sufficient if the master control unit 12 has a mechanism to change a timing of a signal detection and the slave control units 29a-29d have a mechanism that changes a state of a signal to be transmitted by following the change. For example, genuine submodules 28a-28d may share the predetermined rule beforehand and may be set to follow the change of a timing of a signal detection.

The master control unit 12 does not need to have the classification unit 50.

It is not necessary that the master control unit 12 does not have both a combination of the reset pulse transmission unit 43 and the presence pulse detection unit 44 and a combination of the data transmission request signal transmission unit 45 and the data signal detection unit 46. Alternatively, the master control unit 12 has either one of the combinations. If the master control unit 12 includes only a combination of the reset pulse transmission unit 43 and the presence pulse detection unit 44, it is sufficient that the slave control units 29a-29d include a combination of the reset pulse detection unit 63 and the presence pulse transmission unit 64, and the data transmission request signal detection unit 65 and the data signal transmission unit 66 are not necessary. If the master control unit 12 includes only a combination of the data transmission request signal transmission unit 45 and the data signal detection unit 46, it is sufficient that the slave control units 29a-29d include a combination of the data transmission request signal detection unit 65 and the data signal transmission unit 66, and the reset pulse detection unit 63 and the presence pulse transmission unit 64 are not necessary.

In a conventional image forming device, not only a detachable submodule that is intended by a manufacturer (such as a genuine product) but also a detachable product that is not different from a product intended by the manufacturer (a non-genuine product, an imitation product, etc.) may be attached to a main body of an image forming device. However, attachment of a detachable product that is not different from a product intended by the manufacturer to a main body may lead a malfunction of an image forming device. Therefore, it is necessary to prevent a malfunction of the image forming device in advance by preventing fitting of a detachable submodule that is not intended by a manufacturer to a main body of an image forming device as possible.

In a typical background art, a control means detects a voltage of a serial communication line at the timing when a slave communication means transmits an ACK signal onto a serial communication line. If a voltage detected at this time is out of a predetermined normal range, connection abnormality information is produced. However, if a third party acquires information relating to a value of the voltage, it is possible to modify a normal range so that the voltage belongs to the normal range even if a device attached to a main body is a non-genuine or imitation submodule. When such a non-genuine or imitation submodule is attached to a main body of an image forming device, a system cannot definitely discriminate whether the submodule is a detachable submodule intended by the manufacturer of the image forming device or a submodule not intended by the manufacturer.

In another typical background art, a synchronous communication communicating in synchronization with clock signals is performed between a master device and a cascade-connected slave device. However, in a synchronization serial communication communicating in synchronization with clock signals, other person can read communication data relatively easily. If communication data is read, it becomes easy to produce a non-genuine or imitation submodule. Fixing such a non-genuine or imitation submodule to a main body of an image forming device may lead a malfunction of the image forming device. Therefore, a system using a communication form that is hard to be read by others has been demanded.

In an image forming device according to this disclosure, a timing to detect a signal by a master control unit is changed in accordance with a predetermined rule. A slave control unit includes a notification signal detection unit that detects change or the timing and a transmission signal changing unit that changes a state of a signal to be transmitted so that the signal can be detected by the master control unit at a changed timing. In a conventional asynchronous communication, a detection timing by the master control unit is unchangeable, and thus, communication is interrupted when the timing is changed. Therefore, when a submodule that does not include a notification signal detection unit and a transmission signal changing unit is attached to a main body, normal communication is no longer continuable after the change of the timing to detect a signal.

Meanwhile, the slave control units provided in the submodule according to this disclosure include a notification signal detection unit and a transmission signal changing unit. Thus, even if a timing of the signal detection in the master control unit is changed, a slave control unit follows the change and changes the state of a signal to be transmitted. The signal is detected by a master control unit at the timing after the change. The communication between master and slaves is thereby continued. A normal operation is continued only when a submodule intended by a manufacturer of an image forming device is attached to a main body. In addition, it is difficult for a third party to analyze communication data because the image forming device includes a mechanism that uses an asynchronous serial communication and changes the timing of detection. Therefore, it is possible to avoid a situation in which a submodule that is different from a product intended by a manufacturer is attached to the main body, and operates an image forming device.

The embodiments described above are to be considered in all aspects as illustrative only and not restrictive in any manner. The scope of this disclosure is defined not by the explanation described above, but by claims. All changes which come within the meaning and range of equivalency of the claims are to be embraced within the scope of the present disclosure.

The technique of the present disclosure is available in a field where an image forming device which can reduce a risk of a malfunction beforehand by avoiding a situation in which a submodule that is different from a product intended by a manufacturer of the image forming device is attached to the main body, and operates an image forming device.

What is claimed is:

1. An image forming device to form an image on a sheet of paper, comprising:
   a main body, and
   a submodule detachably disposed on the main body,
   the main body including an asynchronous serial bus,
   and a master control unit that is connected to the asynchronous serial bus, transmits a first signal onto the asynchronous serial bus, and detects, on the asynchronous serial bus, a second signal transmitted in response to the first signal at a scheduled timing,
   the submodule including a slave control unit that is connected to the asynchronous serial bus, and, when detecting the first signal transmitted from the master control unit on the asynchronous serial bus, transmits a second signal detectable by the master control unit in response to the first signal at the scheduled timing, wherein
   an interactive asynchronous serial communication is performed between the master control unit and the slave control unit,
   the master control unit includes a detection timing changing unit that changes the scheduled timing to detect the second signal from a first timing to a second timing in accordance with a predetermined rule, and
   a timing update notification transmission unit that transmits a notification signal to notify an update of the scheduled timing changed by the detection timing changing unit to the slave control unit onto the asynchronous serial bus, and
   the slave control unit includes a timing update notification detection unit that detects the notification signal transmitted from the timing update notification transmission unit on the asynchronous serial bus, and
   a transmission signal changing unit that changes a state of the second signal from a first state detectable by the master control unit at the first timing to a second state detectable by the master control unit at the second timing when the timing update notification detection unit detects the notification signal.

2. The image forming device according to claim 1, wherein
   the first signal is a reset pulse signal to search the presence of the slave control unit, and
   the second signal is a presence pulse signal returned from the slave control unit to the master control unit to indicate the presence of the slave control unit in response the reset pulse signal,
   the master control unit further includes
   a reset pulse transmission unit that transmits the reset pulse signal onto the asynchronous serial bus, a presence pulse detection unit that detects, at a scheduled timing, the presence pulse signal transmitted from the slave control unit onto the asynchronous serial bus in response to the reset pulse signal transmitted from the reset pulse transmission unit, the slave control unit further includes a reset pulse detection unit that detects the reset pulse signal transmitted from the reset pulse transmission unit on the asynchronous serial bus, and a presence pulse transmission unit that transmits the presence pulse signal onto the asynchronous serial bus when the reset pulse detection unit detects the reset pulse signal.

3. The image forming device according to claim 1, wherein the first signal is a data transmission request signal to request to transmit data from the master control unit to the slave control unit, the second signal is a data signal transmitted from the slave control unit onto the asynchronous serial bus in response to the data transmission request signal, the master control unit further includes a data transmission request signal transmission unit that transmits a data transmission request signal onto the asynchronous serial bus, and a data signal detection unit that detects, at the scheduled timing, the data signal transmitted from the slave control unit onto the asynchronous serial bus in response to the data transmission request signal transmitted from the data transmission request signal transmission unit, and the slave control unit further includes a data transmission request signal detection unit that detects the data transmission request signal transmitted from the data transmission request signal transmission unit on the asynchronous serial bus, and a data signal transmission unit that transmits the data signal onto the asynchronous serial bus when the data transmission request signal detection unit detects the data transmission request signal.

4. The image forming device according to claim 1, wherein the slave control unit further includes a serial number information storage unit that stores unique serial number information assigned to each slave control unit, the master control unit further includes a serial number acquisition unit that inquires the serial number information storage unit, and serial numbers of all slave control units connected to the asynchronous serial bus, a serial number storage unit that stores the serial number acquired by the serial number acquisition unit, and a slave reference unit that refers to and compares serial number information that has been stored beforehand in the serial number storage unit and serial number information newly acquired by the serial number acquisition unit, wherein, as a result of comparison by the slave reference unit, if at least one piece of the serial number information that has been stored beforehand in the serial number storage unit and the serial number information newly acquired by the serial number acquisition unit is different, the detection timing changing unit changes the scheduled timing to detect the second signal from a first timing to a second timing.

5. The image forming device according to claim 1, wherein the slave control unit further includes a serial number information storage unit that stores a unique serial number information assigned to each slave control unit, and the master control unit further includes a serial number acquisition unit that inquires the serial number information storage unit and acquires serial numbers of all slave control unit connected to the asynchronous serial bus, and a classification unit that classifies the slave control unit into a predetermined category on the basis of the serial number information acquired by the serial number acquisition unit, the detection timing changing unit changes settings of the first timing and the second timing for each category classified by the classification unit.

6. The image forming device according to claim 1, wherein at least one of the first timing and the second timing is set so as to be different for each destination where the image forming device is used.

7. The image forming device according to claim 1, wherein at least one of the first timing and the second timing is set to be different for each model of the image forming devices.

8. The image forming device according to claim 1, wherein the submodule is at least one selected from the group consisting of a toner cartridge, a transcription unit, a fixing unit, and a belt unit.

* * * * *